(12) United States Patent
Mousis

(10) Patent No.: US 11,484,020 B2
(45) Date of Patent: Nov. 1, 2022

(54) INTEGRATED PROTECTIVE CASE FOR FISHING ROD AND REEL AND PRETIED FISHING LURE

(71) Applicant: Gregory Louis Mousis, Lebec, CA (US)

(72) Inventor: Gregory Louis Mousis, Lebec, CA (US)

(*) Notice: Subject to any disclaimer, the term of this patent is extended or adjusted under 35 U.S.C. 154(b) by 135 days.

(21) Appl. No.: 16/840,373

(22) Filed: Apr. 4, 2020

(65) Prior Publication Data

US 2021/0307309 A1 Oct. 7, 2021

(51) Int. Cl.
*A01K 97/08* (2006.01)
*A01K 97/10* (2006.01)
*A01K 97/06* (2006.01)
*B65D 85/08* (2006.01)

(52) U.S. Cl.
CPC .............. *A01K 97/08* (2013.01); *A01K 97/06* (2013.01); *A01K 97/10* (2013.01); *B65D 85/08* (2013.01)

(58) Field of Classification Search
CPC ........ A01K 97/00; A01K 97/06; A01K 97/08; A01K 97/10; B65D 85/08; B65D 85/20
See application file for complete search history.

(56) References Cited

U.S. PATENT DOCUMENTS

| | | | |
|---|---|---|---|
| 2,723,482 A * | 11/1955 | Marten | A01K 97/08 206/315.11 |
| 3,641,697 A * | 2/1972 | Heidtman | A01K 97/08 206/315.11 |
| 3,674,190 A * | 7/1972 | Wright | A01K 97/08 294/166 |
| 5,277,306 A * | 1/1994 | Sargent | A01K 97/08 206/315.11 |
| 5,893,502 A * | 4/1999 | Redzisz | F41C 33/06 224/586 |
| D427,277 S | 6/2000 | Baron | |
| D442,367 S * | 5/2001 | Terrell | D3/260 |
| 6,250,470 B1 * | 6/2001 | Mackenzie | A01K 97/08 206/315.11 |
| D451,670 S * | 12/2001 | Knorr | D3/260 |
| 6,343,728 B1 * | 2/2002 | Carbone | A01K 97/08 224/680 |
| D489,176 S * | 5/2004 | Bazen | A01K 97/08 D3/260 |
| 6,789,713 B1 * | 9/2004 | Redzisz | A01K 97/08 206/315.11 |

(Continued)

*Primary Examiner* — Timothy D Collins
*Assistant Examiner* — Nicholas Leo Seneczko
(74) *Attorney, Agent, or Firm* — Elizabeth Waiguchu

(57) ABSTRACT

An integrated protective fishing case for storing and protecting fishing rod, reel, line and pretied lure. The protective fishing case includes a handle section and a rod sleeve section thereby forming a protective case with an outwardly protruding belly section. The case includes the features: The handle section cover with an outwardly protruding section having an internal cavity for covering and protecting a fishing reel; the internal cavity includes a protective double padded section, internal protective right hand and left hand pockets for storing pretied lures; perforated material allowing ventilation and moisture to escape, thereby protecting the fishing tackle stored in the case from rust; to custom fit fishing rod blanks of varying lengths, the rod tip section length is adjustable.

18 Claims, 15 Drawing Sheets

(56) References Cited

U.S. PATENT DOCUMENTS

| | | | | |
|---|---|---|---|---|
| 6,966,439 | B2 * | 11/2005 | Weleczki | A45C 7/0077 206/315.6 |
| D693,126 | S * | 11/2013 | Drummey | D3/326 |
| 2004/0159689 | A1 * | 8/2004 | Wright | A01K 97/08 224/257 |
| 2012/0227309 | A1 * | 9/2012 | Fanelli | A01K 97/08 43/26 |
| 2014/0366327 | A1 * | 12/2014 | Huang | A01K 87/08 16/421 |
| 2015/0257377 | A1 * | 9/2015 | Moore, Jr. | A01K 97/08 43/26 |
| 2015/0316201 | A1 * | 11/2015 | Roberts | A01K 97/08 248/213.2 |
| 2016/0113263 | A1 * | 4/2016 | Potempa | A01K 97/08 2/87 |

\* cited by examiner

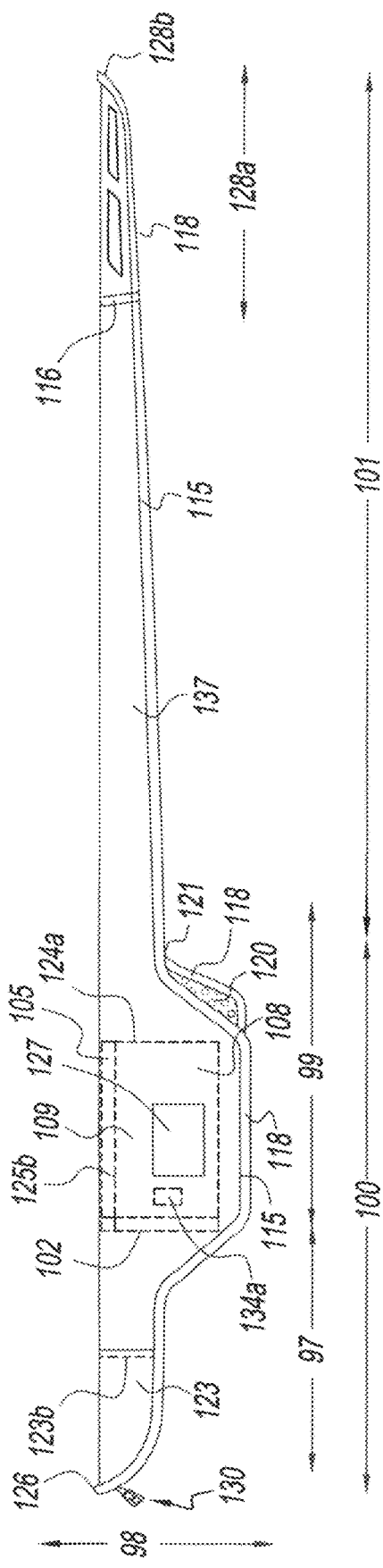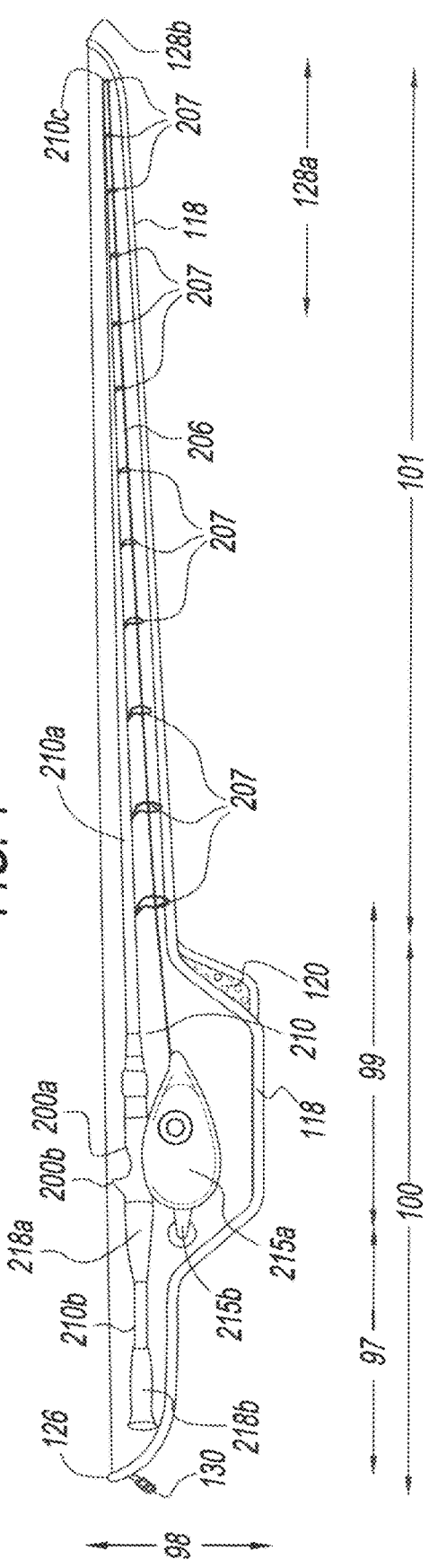
FIG. 1
FIG. 2

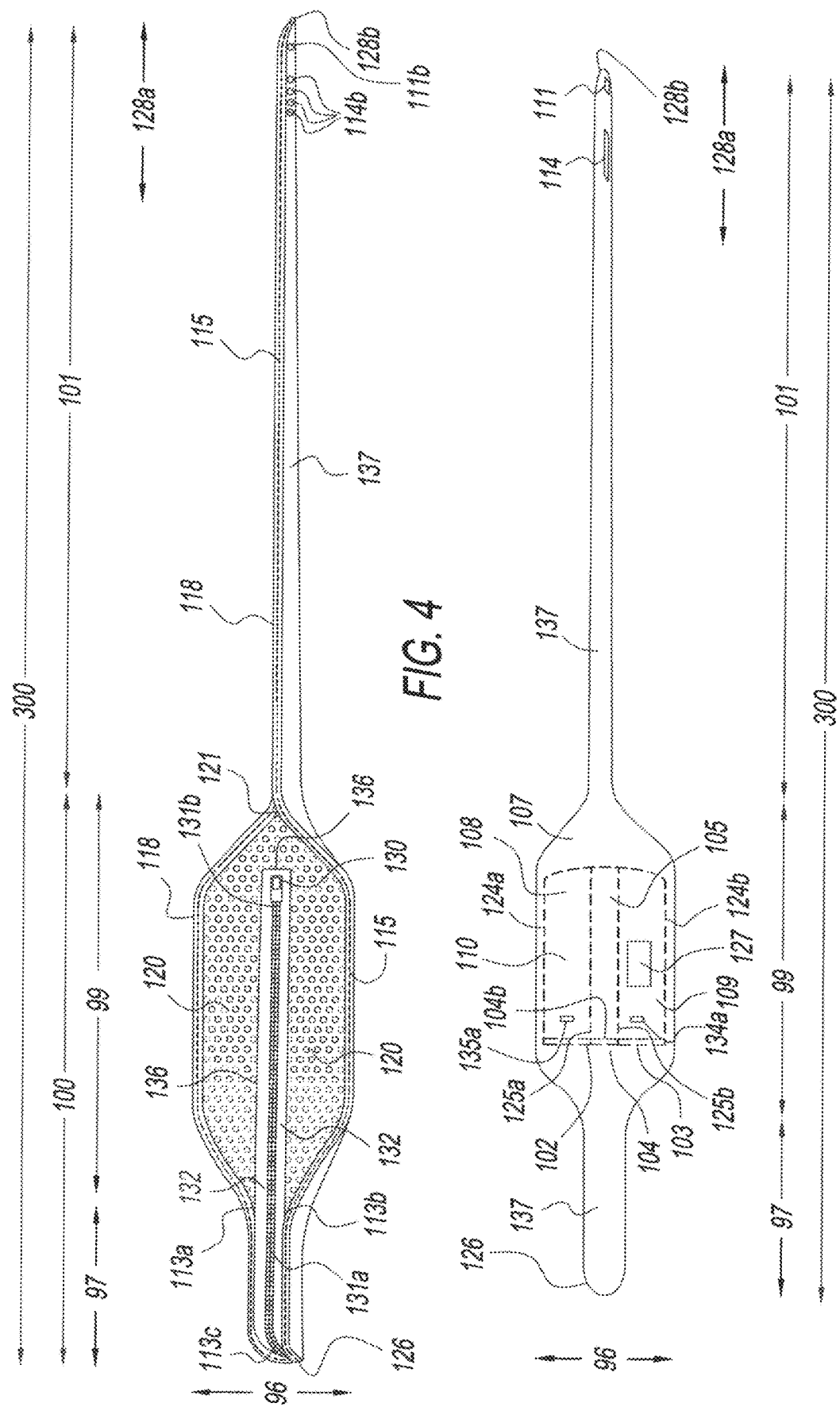

INTEGRATED PROTECTIVE CASE FOR FISHING ROD AND REEL AND PRETIED FISHING LURE

The present invention has no Cross Reference to related applications.

The present invention has no federally sponsored research or development.

The present invention has no parties to a joint research agreement.

The present invention has no Reference to Sequence Listing, a table, or a computer program listing appendix submitted on a compact disc and an incorporation by reference of the material on the compact disc.

FIELD OF INVENTION

This invention relates to protective covers for fishing rods, fishing reels, fishing lures and fishing line.

BACKGROUND

It is well known that many people go fishing every year. Most fishermen and fisherwomen use a rod with an attached reel, spooled with fishing line, and a lure, or hook with bait to attract fish. A fisherman/fisherwoman usually owns multiple rod and reel combinations. In doing so, it is common practice to pre-tie their lures or hooks and weights to their fishing line before embarking on a fishing excursion. This is done so that when they arrive at their destination, they can begin fishing immediately. The result of doing so is that the pre-tied lure, sharp hooks and/or weights bang against, scratch and cause permanent damage to fragile fishing rod blanks, fishing reel/finishes and fishing line. Fishermen/fisherwomen often spend substantial amounts of money on their equipment and prefer to protect their fishing tackle from damage that often occurs while the rods, reels and lures are in transit, whether it be in a boat, car or on land by foot. Some current options include multiple separate covers to protect a user's tackle while being transported/stored in their boat rod lockers or while in transit to a fishing site by vehicle, vessel or on foot. Handling, carrying and keeping track of these multiple separate protective/storage devices/covers for the aforementioned fishing tackle during fishing trips can become tedious and frustrating as items often become scattered throughout the boat or fishing site, not to mention, sometimes being blown from a vessel while moving to another location, resulting in loss of said covers. Using separate multiple covers does not sufficiently address the needs of the fishermen/fisherwomen to simplify this act, all while efficiently/effectively separating, protecting and storing their fishing rod, reel and pre-tied lures/hooks and weight combinations.

BRIEF SUMMARY OF THE INVENTION

An exemplary embodiment of the present disclosure provides an integrated, protective case that is a single unified structure which includes a protective cover for a fishing rod, fishing reel, fishing line and integrated, internal protective storage pockets. A method of manufacturing the same are provided. Applicant describes a fishing case that is easily and conveniently adjustable in length to accommodate varying sizes and lengths of the fishing rods stored within the invention. The protective case constructed in varying sizes and shapes also accommodates different rod and reel types.

The fishing case is an all-inclusive cover-case constructed to easily store and shield the fishing rod, reel, line, lures and/or hook(s) and weights from exposure and damage. By utilizing a plurality of integrated, internal protective storage pockets, the integrated, protective case effectively separates a pre-tied lure, hook(s) and weights from the rod blank, fishing reel and fishing line eliminating damage that occurs while in transit within a boat, car or on foot caused by repeated vibration, banging, sudden movements or impact. The protective fishing case constructed with materials capable of allowing ventilation and moisture inside the case to escape thereby protecting the fishing tackle stored within the case from rust, corrosion or other damage due to long-term exposure to water or the elements. The protective fishing case includes the use of impact resistant materials such as laminated foam, laminated synthetic rubber, and/or synthetic rubbers, or other suitable materials thereby protecting the fragile fishing rod blank, fishing reel, components, fishing line and fishing lure from damage caused by impact, vibration or sudden movement during storage and/or while in transit. In an embodiment the laminated foam, laminated rubber, other material or components of the case can incorporate anti rust, anti-corrosion, moisture wicking and/or antimicrobial properties.

In the preferred embodiment, reinforced sections constructed with durable fabric/materials such as canvas, polymeric materials, synthetic polymers, heavy duty nylon, polyvinyl chloride or other materials, further protect the fishing tackle inside the all-inclusive protective case from impact or damage that can occur in high-wear areas of the case providing additional protection in excessive cases of impact, abrasion, and environments such as rough terrain, shoreline terrain and while traveling on rough water. The protective fishing case having perforated sections or openings allows moisture to evaporate from inside the case, thus allowing the tackle stored within to dry.

The protective fishing case including a main outer layer and a second outer layer segment is coupled via at least one seam forming an outer covering layer and internal cavity. With the zipper in the closed position, the protective case having the main outer layer and second outer layer segment coupled by at least one seam and can utilize binding as a finishing material and means for protecting the seams. A durable rust proof zipper is attached to the main outer layer and the second outer layer segment via a plurality of stitching, creating an easily accessible opening, allowing access to the internal cavity of the all-inclusive, integrated case. The internal cavity includes a rod sleeve section and a back section referred to as a handle section. The handle section includes an outwardly protruding section and a flared section referred to as a belly section and a rear section referred to as a butt section of the case.

The internal cavity includes a plurality of internal protective storage pockets suitable for use on the left or right side of the reel comprising, a right internal protective storage pocket and a left internal protective storage pocket. The left and right-side orientation of the internal protective storage pockets allows a user the ability to store a pre-tied lure or pretied hooks and weights enclosed in a commercially available lure wrap within one of the pockets opposite the handle side of the reel when a fishing rod and reel combination is stored within the case. Other items or tackle can be stored in the additional pocket as well, if the user sees fit. The right internal protective storage pocket is attached to the main outer layer via stitching or other attaching means. The right internal protective storage pocket further includes a right opening capable of receiving and covering one or more lures, hooks and or weights within wraps, tackle and or other miscellaneous items. The right pocket is located inside the internal cavity. The right pocket opening includes the use of soft binding along the opening edge of the right-side pocket capable of reducing friction or damage to fishing line or lures inserted into the pocket.

The left internal protective storage pocket is attached to the main outer layer via stitching or other attaching means. The left internal protective storage pocket further includes a left opening capable of receiving and covering one or more lures, hooks and or weights within wraps, tackle and or other miscellaneous items. The left opening includes the use of soft binding along the opening edge of the left side pocket capable of reducing friction or damage to fishing line or lures inserted into the pocket. The left pocket is located inside the internal cavity.

The internal cavity has a predefined median area between the internal protective storage pockets attached via stitching or other means to the main outer layer. The median area occupies a position approximately equally distant between the right internal protective storage pocket and left internal protective storage pocket. The median area stitching attaches the internal layer segment and forms an additional layer which provides added protection to the fishing rod and fishing rod seat trigger from damage caused by impact, abrasion, sudden or repeated movement.

The internal cavity further includes an internal protective zipper flap comprised of material attached via stitching or other means to the second outer layer segment, zipper assembly and main outer layer. The internal protective zipper flap is attached to the main outer layer and the second outer layer segment and the zipper assembly wherein the internal protective zipper flap is attached to the internal cavity via stitching or other means therein forming a union between the internal protective zipper flap, the main outer layer, the second outer layer segment and the zipper assembly. The internal protective zipper flap disposed to form an additional protective cover/layer between the zipper assembly and stored rod, reel, line, lure and/or hooks and weights further protects stored rod, reel, line, lure and/or hooks and weights from zipper abrasions.

The protective fishing case having an internal cavity comprising a protective rod cover, a protective reel cover, a protective line cover and internal protective storage pockets further include a plurality of hook and loop fastening materials or other means within the opening of the right internal protective storage pocket and within the opening of the left internal protective storage pocket. The hook and loop fastening materials or other means allow the closure and securing of the pretied lures, hooks, weights within wraps, and fishing tackle and wherein the pretied lures, hooks, weights within wraps and or fishing tackle are housed within the internal protective storage pockets separating them from the fragile fishing rod blank, fishing reel, fishing line and their often delicate finishes.

Applicant describes a case having an internal cavity with a plurality of internal storage pocket. In the preferred embodiment two internal protective storage pockets are included to allow a user the ability to store the lure, hooks, weight and lure wrap within the pocket opposite the side of the reel handle, thus efficiently and effectively utilizing the extra space within the internal cavity of the belly section.

Applicant describes an integrated protective fishing case having adjustable, user configurable storage capabilities, thus allowing the user to store, separate, protect and transport various fishing rods, reel, line, pre tied lures, hooks, weights, other items in an all-inclusive protective case.

Applicant also describes the integrated protective fishing case having a protective layer constructed to allow moisture to escape thereby preventing rust, corrosion or moisture related damage to the rod, reel, line, lure, hooks and or weights stored within the protective case.

Applicant describes an integrated protective fishing case having a plurality of protective materials and features thereby preventing damage to the rod, reel, line, lures, hooks and or weights due to impact, vibration, and or movement. The integrated protective fishing case includes a means for adjusting the overall length of the integrated protective case, thus accommodating varying lengths of fishing rods to be stored within the case. The protective fishing case includes a means for storing pretied lures, hooks, and or weights or other fishing tackle while separating them from the fragile fishing rod blank, fishing reel, and fishing line. The protective case further eliminates the need to tie on the lures or hooks and or weights upon arrival to the fishing destinations. The protective case provides a means for preventing damage caused by lures, sharp hooks, weights marring or impacting the fragile fishing rod blank, reel, finishes, components and fishing line stored within the case.

BRIEF DESCRIPTION OF THE DRAWINGS

Some embodiments of apparatuses and methods in accordance with embodiments of the present invention are now described, by way of example only, and with reference to the accompanying drawings, in which:

FIG. 1 is a schematic illustration side view of the Protective Case for Fishing Rod and Reel and pre tied Fishing lure, hooks, weights.

FIG. 2 is a schematic illustration side view of the integrated protective fishing case housing a conventional or baitcasting rod and reel combination.

FIG. 4 is a perspective illustration of the integrated protective fishing case viewed from the top.

FIG. 5 is a perspective illustration of the integrated protective fishing case viewed from the bottom. FIG. 5B and FIG. 5C depict the tip section of the case with the stored rod blanks. The length of the stored fishing rod blank is shorter than the fishing case FIG. 6 A is a schematic illustration of adjustment means for the overall length of the protective case utilizing a retaining strap.

DETAILED DESCRIPTION OF THE INVENTION

Figure 3:
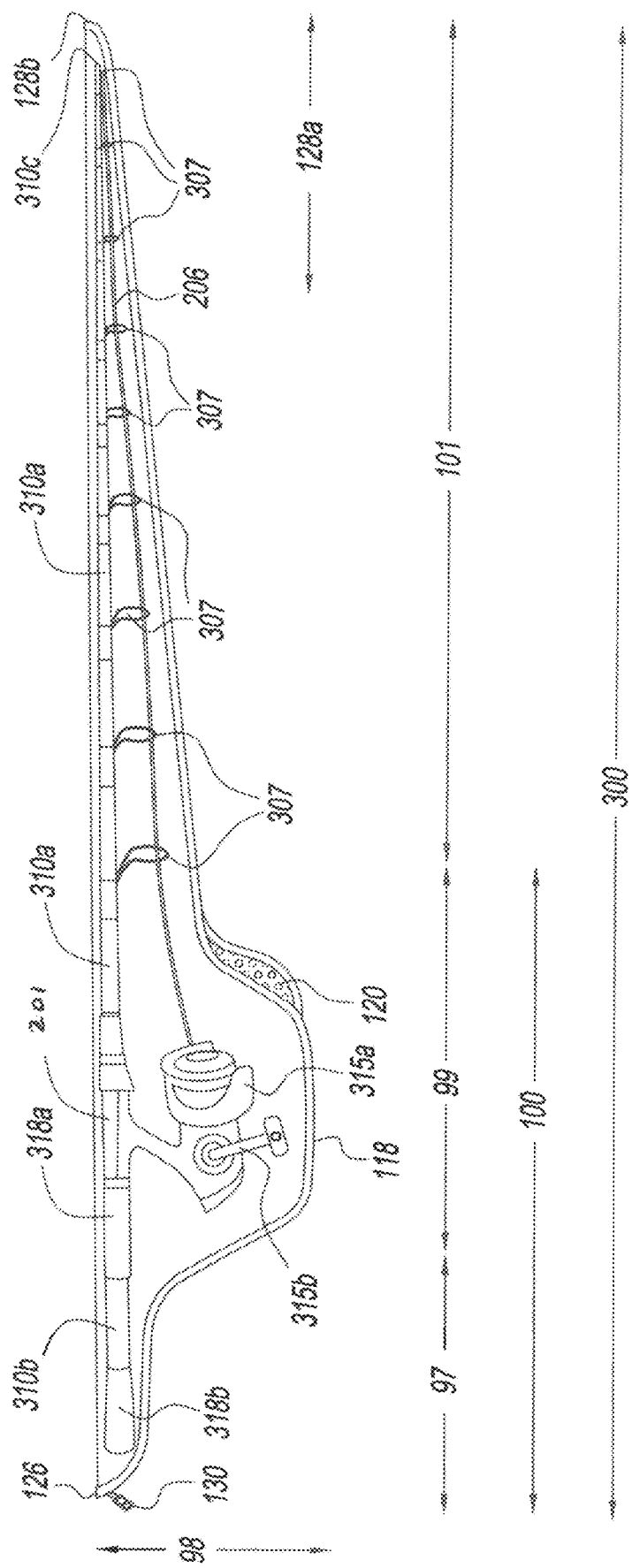
FIG. 3 is a side view of the integrated protective case housing a spinning rod and reel combination.

The above features and advantages and other features and advantages of the present teachings are readily apparent from the following detailed description of the modes for carrying out the present teachings when taken in connection with the accompanying drawings.

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, a disclosure of a range is to be understood as specifically disclosing all values and further divided ranges within the range. All references referred to are incorporated herein in their entirety. The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced claims of the appended claims, including "any one of" the referenced claims. Those having ordinary skill in the art will recognize that terms such as "above", "below", "upward", "downward", "top", "bottom", etc., may be used descriptively relative to the figures, without representing limitations on the scope of the invention, as defined by the claims. Those skilled in the art will recognize that the conventional or baitcasting reel describe the same item. Referring to the drawings, wherein like references numbers refer to like components.

FIG. 1

FIG. 1 is a schematic side view depicting a one-piece integrated protective fishing case 300. The integrated protective case 300 is a single unified structure which eliminates the need for separate fishing rod and reel protection devices by integrating both into an easy to use one-piece, storage and protective case 300. The Integrated protective fishing case 300 is configured and described herein to protect and separate a fishing rod, a fishing reel and fishing line from a pretied lure, hook and or weight to eliminate damage that occurs from sharp hooks and or weights scratching or banging against the fishing rod, fishing reel, finishes, and components during transit while stored in boats, rod lockers or in hand. The integrated protective storage case 300 comprises a rod sleeve section 101, a handle section 100 comprised of an outwardly protruding 98 flared 96 belly section 99 and a butt section 97. Depicted in FIG. 1 is the tip end 128b and butt end 126. The rod sleeve section 101 is comprised of an adjustable tip section 128a utilizing a retaining strap 116 or other adjustment means described in FIGS. 6A, 6B, and 6C. The case 300 is constructed by including a main outer 137, a second outer layer segment 120 than can be perforated, a zipper assembly 130, 131a, 132, binding material 118, an internal layer segment 108 that forms the internal pockets and median area, a reinforcing butt layer 123, and plurality of hook and loop fastening material, nylon snaps, woven, or knitted material 116, and other suitable materials. A plurality of soft material referred to as the binding 118 can be attached via stitching or other means 115 and covers the seams and or unions along all the edges of the protective case 300. The binding 118 can be comprised of soft nonabrasive and durable material such as knitted or woven, polyester, nylon, elastane or other suitable materials. The binding 118 can also be comprised of heavy duty or extra durable material such as nylon based woven fabric or other suitable materials. In the preferred embodiment, the binding 118 is comprised of soft nonabrasive and durable material. The binding 118 protects the seams and unions and additionally serves as a decorative finished edge for the integrated protective case 300.

In an embodiment the reinforcing butt layer 123 is attached via stitching 123b, 115 to the main outer layer 137 generally at the end of the butt section 97 extending to the butt tip 126. The reinforcing butt layer 123 is included in an embodiment designed to further protect the rear grip 218b (shown in FIG. 2) from heavy use, impact and or abrasions that can occur while on rough terrain, rough water or other rough environments. The zipper pull 130 allows a user a means for opening and closing the integrated protective storage case 300. The belly section 99 is outwardly protruding 98 and flared 96 (shown in FIG. 4) to accommodate and protect the fishing reel 215a, 215b (shown in FIG. 2), 315a, 315b (shown in FIG. 3). The handle section 100 comprises of the outwardly protruding 98 flared portion 96 of the belly section 99 and the butt section 97. The internal cavity 107 (shown in FIG. 5) houses the internal protective storage pockets 109, 110 (shown in FIG. 5), the double layered median section 105 and includes hook and loop fastening materials 134a, 135a (shown in FIG. 5) and binding 104 (shown in FIG. 7). The internal cavity 107 (shown in FIG. 5) further includes other means for opening and closing the internal protective storage pockets 109,110 attached inside the openings 102, 103 of the internal protective storage pockets 109, 110 (depicted in FIG. 5). The internal protective storage pockets 109, 110 and a double layer median layer 105 are attached to the inside of the internal cavity 107 via stitching or other means 124a, 124b, 125a, 125b (depicted in FIG. 5).

The integrated protective case 300 further includes means for content identification wherein identifying the stored items, branding and or size identification 127 such as a viewing window to see stored items, inscribable label, woven label, tag, embroidery or other form of identification. The window, label, tag, embroidery and or other means of branding 127 is integrated into or attached to the outside of the belly section 99 via stitching or other means for fast, easy identification of stored items, size and or model of the integrated protective fishing case 300. The forward union 121 joins the main outer layer 137 and second outer layer segment 120 at the front of the flared portion 96 of the outwardly protruding 98 belly section 99. The forward union 121 is created by a plurality of stitching or other means 115 that attaches the binding 118 along the edges of the main outer layer 137 and second outer layer segment 120.

FIG. 2

FIG. 2 is a schematic illustration side view of the integrated protective fishing case housing a conventional/baitcasting rod 200a, 200b, 210a, 210b, 210c, 218a, 218b, 207 and conventional/baitcasting reel 215a, 215b combination. The integrated Protective case comprises of a rod sleeve section 101 and a tip section 128a, 128b designed and constructed to house and protect a conventional/baitcasting fishing rod blank 210a, a conventional/baitcasting fishing rod tip 210c, a conventional/baitcasting fishing rod guides 207, and the fishing line 206 from damage, caused by impact, abrasions, entanglement and or other harmful environments. In this embodiment the integrated protective fishing case 300 comprises of a handle section 100 having an outwardly protruding 98 flared 96 belly section 99 designed and constructed to house and protect a conventional/baitcasting reel 215a, 215b, a conventional/baitcasting fishing rod blank 210, a conventional/baitcasting fishing rod reel seat 200a, a conventional/baitcasting fishing rod reel seat trigger 200b and a portion of main fishing rod grip 218a. In this embodiment the integrated protective fishing case 300 comprises of a handle section 100 and a butt section 97, butt end 126 designed and constructed to house and protect the portion of the main grip 218a, the rear blank section 210b, rear grip 218b from damage that can occur caused by impact, abrasions and or other harmful environments.

FIG. 3

FIG. 3 is a schematic illustration side view of the integrated protective fishing case 300 housing a spinning rod 201, 310a,310b,310c,307, 318a, 318b and spinning reel 315a, 315b combination. The integrated protective case includes a rod sleeve section 101 and a tip section 128a, 128b designed and constructed to house and protect the fishing rod blank 310a, the fishing rod tip 310c, the fishing rod guides 307, and fishing line 206 from damage caused by impact, abrasions and or harmful environments. This figure depicts an embodiment of the integrated protective fishing case 300 comprising of a handle section 100 having an outwardly protruding 98 flared 96 belly section 99 designed and constructed to house and protect a spinning reel 315a, 315b, a portion of the spinning fishing rod blank 310a, spinning rod reel seat 201, and a portion of the spinning rod main rod grip 318a. In this embodiment the integrated protective fishing case 300 comprised of a handle section 100 and a butt section 97, 126 is designed and constructed to house and protect a portion of the spinning rod main grip 318a and the rear blank 310b, rear grip 318b from damage that can occur due to impact, abrasions and or other harmful environments.

FIG. 4

Figure 6A:
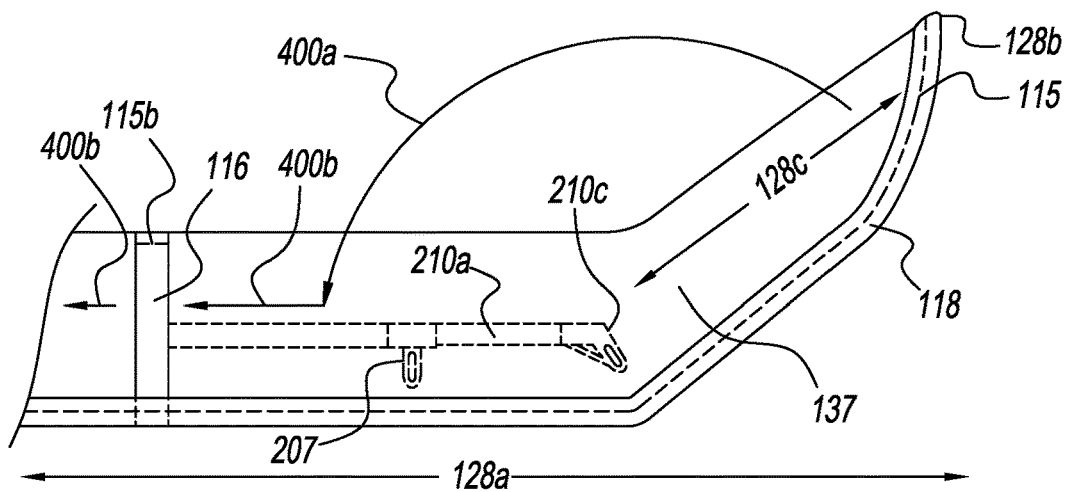
FIG. 6 B is a schematic illustration of adjustment means for the overall length of the protective case utilizing rust-proof nylon or plastic snaps.
FIG. 6C is a schematic illustration of adjusting the tip section by utilizing hook and loop fastening material to custom fit a stored fishing rod blank within the case.
FIG. 6D, FIG. 6E, FIG. 6F depict adjusted tip section in the closed position.
Figure 6B:
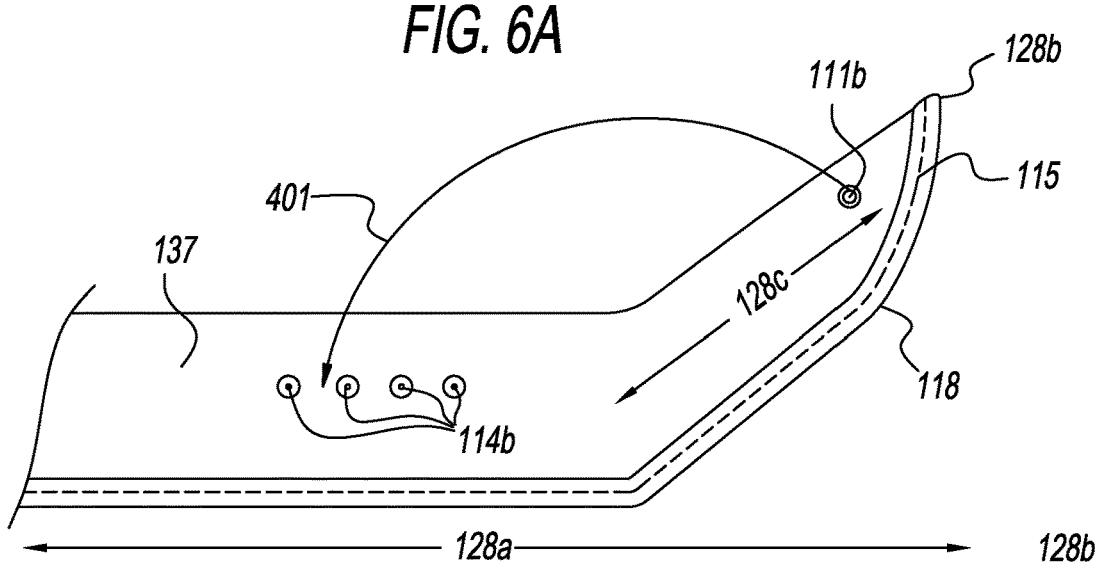
Figure 6C:
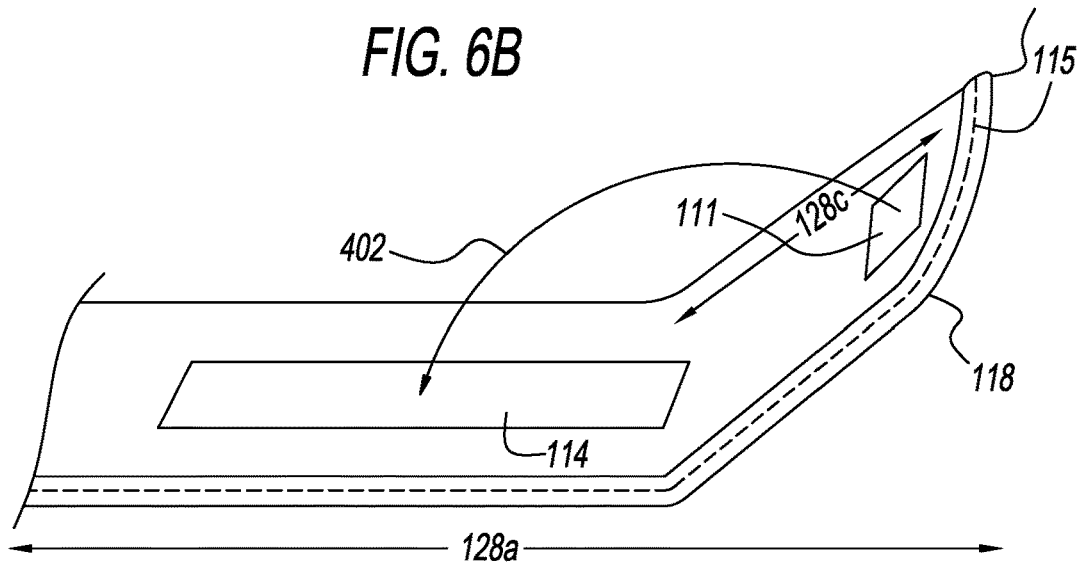

FIG. 4 is a perspective illustration of the integrated protective fishing case 300 viewed from the top. The integrated protective fishing case 300 comprised of a rod sleeve section 101 having the tip section 128a,128b that provide an adjustment means 114b, 111b. In the embodiment depicted in FIG. 4, the adjustment means comprised of rust proof nylon snaps 114b, 111b are arranged in predetermined increments and attached to the tip section 128a via stitching or other means. The rust proof nylon snaps 114b, 111b allow a user the ability to fold over excess material within the tip section 128a, 128b as shown in FIG. 6A, 6B, 6C and secure it using the nylon snaps 114b, 111b providing a custom fit for various lengths of fishing rods. The integrated protective fishing case 300 comprised of a handle section 100 includes the outwardly protruding 98 (as shown in FIG. 1), flared 96 belly section 99 and butt section 97, 126. The second outer layer segment 120 is attached to the main outer layer 137 and zipper assembly 131b, 130,131a, 132 via stitching or other means 115, 136 thereby forming a plurality of unions 113a, 113b, 113c, 121 between the main outer layer 137, the second outer layer 120 and zipper assembly 131b having zipper components 130,131a,132. The unions can also be arranged in various locations on and within the fishing case 300 as needed to address varying sizes of fishing rods, reels, lures, tackle. The binding 118 is attached via stitching or other means 115. The binding 118 covers and protects seams and unions of and within the protective fishing case 300.

In a preferred embodiment depicted in FIG. 4 the belly section 99 includes the second outer layer segment 120 comprised of breathable material such as perforated laminated foam, perforated laminated rubber or other suitable materials. In other embodiments these materials can be included or used in other areas of the case 300. In the preferred embodiment the breathable and or perforated second outer layer segment 120 provides ventilation within the internal cavity 107 (shown in FIG. 5) allowing moisture to escape and or evaporate thereby preventing damage that can be caused by exposure to water and or other elements. The zipper assembly 131b comprises of zipper components 130,131a, 132. In a preferred embodiment a rust proof zipper assembly 131b, 130,131a, 132 is attached to the second outer layer segment 120 and the main outer layer 137 via stitching or other means 136, 115. The zipper assembly 131b, 130,131a, 132 allows access to the internal cavity 107 and the internal protective storage pockets 109,110 depicted in FIG. 7.

The zipper assembly 131b is capable of opening and closing the belly section 99 and the butt section 97. Opening the zipper assembly 131b allows access to the internal cavity 107 having the left internal protective pocket 109 and the right internal protective pocket 110. Opening the zipper assembly 131b allows the fishing rod, fishing reel, pre tied lures, hooks, weights within wraps to be inserted into the protective case 300. Closing the zipper assembly 131b secures the fishing rod, fishing reel, pre tied lures, hooks, weights within the protective case 300.

Union 121 between the binding 118, the main outer layer 137 and the second outer layer segment 120 defines the front of the flared portion 96 of the belly section 99. The unions 113a, 113b, 113c on either sides and at the end of the zipper assembly 131b, the binding 118, the main outer layer 137 and the second outer layer segment 120 defines the back of the flared portion 96 of the belly section 99 and the butt section 97. The rod sleeve section 101 of the case 300 has a union between the binding 118 and the main outer layer 137 and thereby defines the tip section 128a and tip end 128b of the case 300. FIG. 4 and FIG. 6B show nylon or rustproof snaps 111b, 114b as a means for adjusting the overall length of the fishing case 300.

FIG. 5

FIG. 5 is a schematic illustration of the protective case 300 viewed from the bottom. The protective fishing case 300 includes a main outer layer 137, a second outer layer segment 120 (shown in FIG. 4) and an internal layer segment 108. The case 300 includes the flared portion 96 of the belly 99 having an internal cavity 107. A plurality of stitching or other means 124*a*, 124*b*, 125*a*, 125*b*, 104*b* is shown. The stitching or other means 124*a*, 124*b*, 125*a*, 125*b* is used for attaching the internal layer segment 108 to the inside of the main outer layer 137 within the internal cavity 107. The stitching or other means 124*a*, 124*b*, 125*a*, 125*b* forms the internal protective storage pockets 109,110 and double layered median section 105. The binding 104 is attached along the edge of the internal layer segment 108 via stitching or other means 104*b* at the openings 102, 103 of the internal protective storage pockets 109,110 and double layered median section 105.

Hook and loop fastening material or other means 134*a*, 135*a* attached inside near the openings 102,103 of the internal protective storage pockets 109,110 is capable of securing a pretied lure, hooks, weights within commercially available lure wraps 601 inserted into the internal protective storage pockets 109, 110. The protective case 300 includes a means of viewing and or identifying stored items, identifying size or model of the case, and or branding 127 allowing a user to quickly access desired rod, reel, tackle combinations and or sizes. The double layered median section 105 provides additional protection for the fishing rod 210*a*, 310*a* fishing rod reel seat 200*a*, 201 fishing rod reel seat trigger 200*b* and fishing rod main grip 218*a* (shown in FIG. 2 and FIG. 3).

Figure 5A:
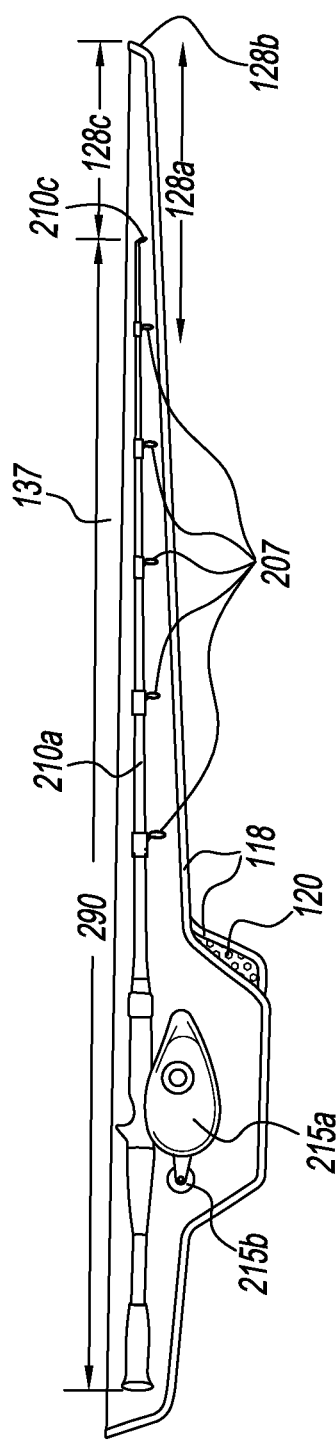
FIG. 5A is a perspective illustration of a fishing reel attached to a fishing rod blank that has a length shorter than the case.
Figure 5B:
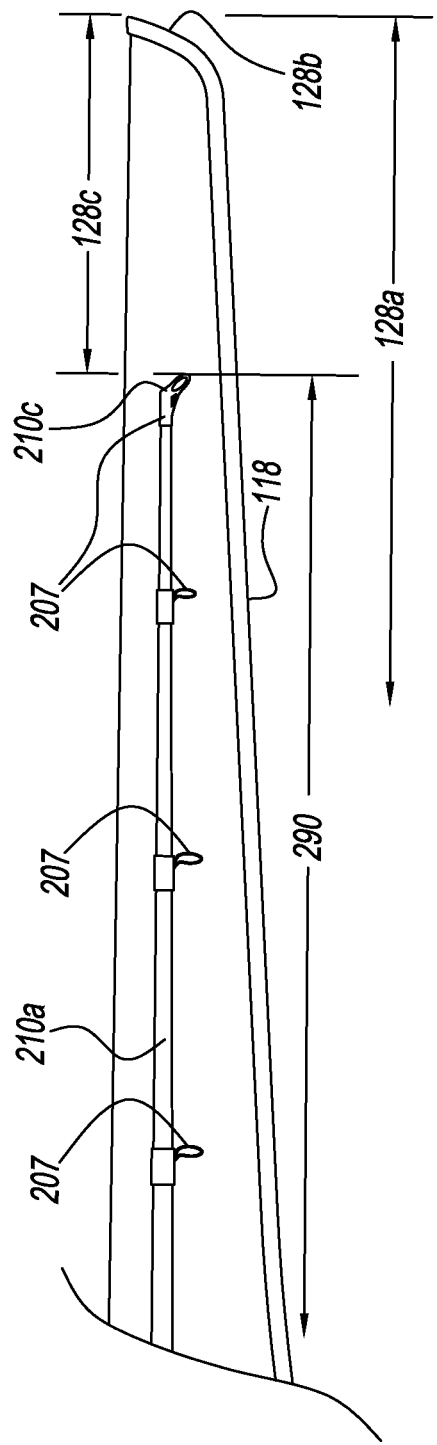
FIG. 5B and FIG. 5C depict the tip section of the case having a shorter fishing rod blank than the fishing case.
Figure 5C:
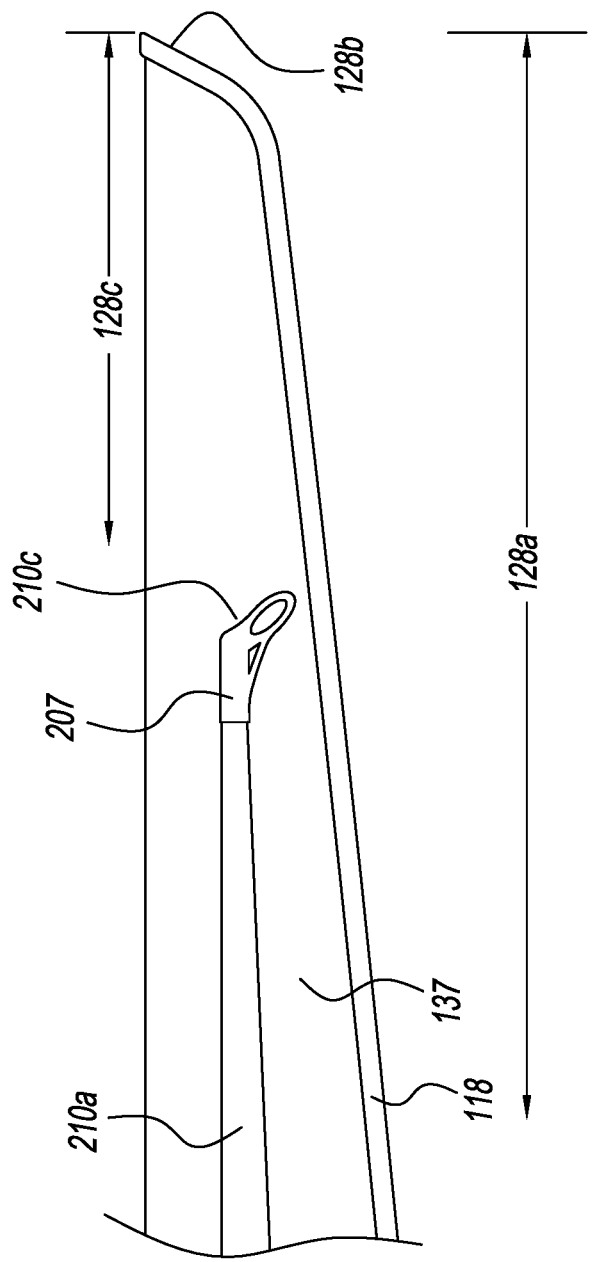
Figure 6D:
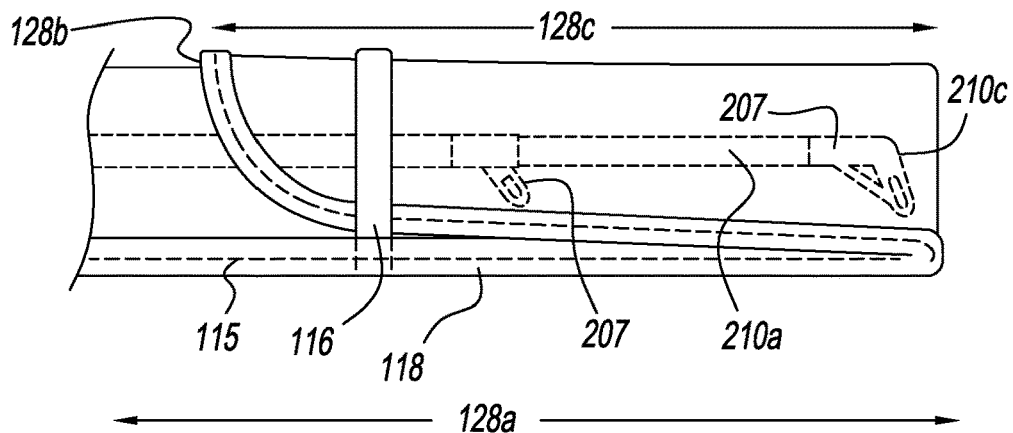
Figure 6E:
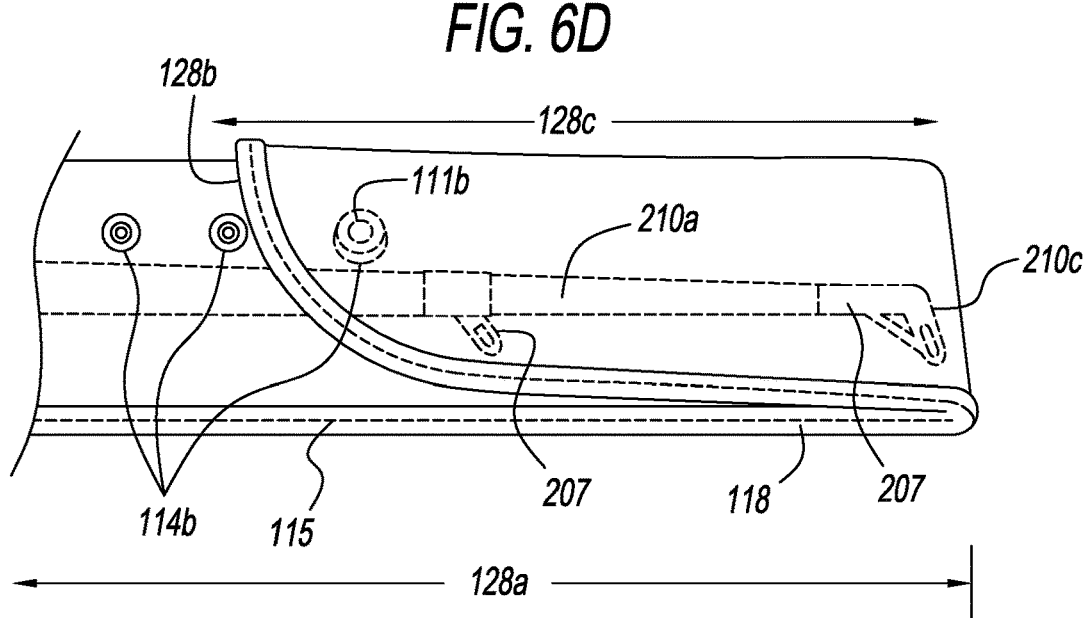
Figure 6F:
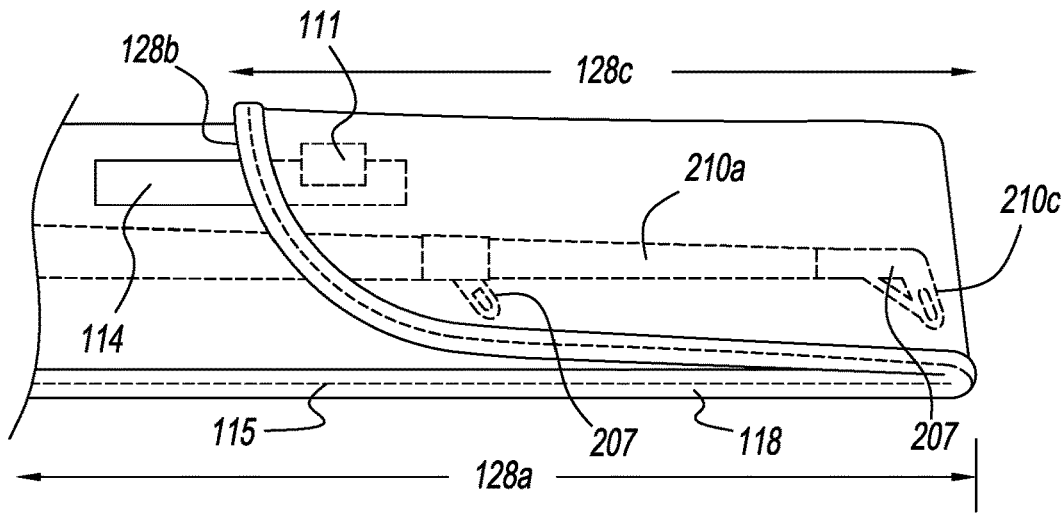

Due to the varying lengths of fishing rods the case 300 has an adjustable length of the tip section 128*a*. The protective fishing case 300 having an internal cavity 107 comprises a protective cover for a fishing rod and reel within the belly section 99 of the handle section 100. The embodiment shown in FIG. 5 shows a adjusting the overall length of the case 300 using hook and loop materials 111, 114. The tip section 128*a*, 128*b* depicts hook and loop fastening material 111, 114 for adjusting the overall length of the case 300 as shown and described in FIG. 6C. FIG. 5A depicts a fishing reel 215*a* attached to a fishing rod blank 210*a* that has a length 290 shorter than the case 300. Excess material 128*c* within the tip section 128*a* can be adjusted to custom fit the stored rod 210*a*. The excess material 128*c* is folded over to provide a custom fit for the stored fishing rod. The folding over also eliminates the excess material from flopping around or getting entangled (FIG. 6D, FIG. 6E, FIG. 6F). FIG. 5B and FIG. 5C depict the tip section 128*a* of the case 300 with a stored rod blank 290. The stored fishing rod blank 290 is shorter than the case 300. FIG. 5B and FIG. 5C depict the excess material 128*c* in the tip section 128*a* when a rod blank 290 shorter in length than the case 300 is stored within the case 300.

FIG. 6A, FIG. 6B, FIG. 6C, FIG. 6D, FIG. 6E, FIG. 6F

Fishing rods are available in varying lengths and types. FIG. 6A, FIG. 6B and FIG. 6C depict the adjustable tip section 128*a*, 128*b* of the case 300 and adjusting the overall length of the case 300 by folding over loose and or excess material 128*c* within the tip section 128*a* of the rod sleeve section 101 that results from shorter fishing rods stored within the case. Adjusting the overall length of the case creates a custom fit for fishing rod blanks of varying lengths.

Illustrated in FIG. 6A is an example of a fishing rod which is shorter than the overall length of the case 300. To custom fit the stored fishing rod 210*a* and the rod tip 210*c*, fishing rod guides 207 into the fishing case 300, excess material 128*c* within the tip section 128*a* is folded over and the overall length of the case 300 is adjusted to accommodate the inserted shorter rod blank 210*a*. In FIG. 6A, the tip end 128*b* can be folded over 400*a* and tucked 400*b* underneath the retaining strap 116. This eliminates excess material 128*c* within the tip section 128*a*. The retaining strap 116 can vary in width, length and placement wherein the retaining strap 116 can be made from materials such as elastic, elastane, nylon, woven nylon, canvas, laminate, rubber, polyester, leather, foam or other suitable materials. The retaining strap 116 is attached along the outside of the main outer layer 137 within the tip section 128*a* at varying predetermined distance from the tip end 128*b* and is attached via stitching 115, 115*b*.

FIG. 6B depicts an alternative for adjusting the length of the tip section 128*a*, within the rod sleeve section 101 to accommodate varying lengths of stored fishing rods, and thereby removing excess material 128*c* and providing a fitted solution for shorter rods stored within the case 300. In FIG. 6B nylon or snaps 111*b*, 114*b* are attached to the main outer layer 137 within the tip section 128*a*, at varying predetermined distances and or increments from the tip end 128*b*. A male or female snap 111*b* is attached near the tip end 128*b*. A plurality of receiving snaps 114*b* are attached further away from the tip end 128*b* within the tip section 128*a* starting at predetermined distance from 128*b* and attached at predetermined increments. The tip end 128*b* with male or female snap 111*b* can be folded over 401 and attached to one of several receiving snaps 114*b* thereby adjusting the length of the tip section 128*a* and removing excess material 128*c* and adjusting the length of the tip section 128*a* and shortening the overall length of the case 300.

FIG. 6C depicts another alternative for adjusting the length of the tip section 128*a* and eliminating excess material 128*c* within the rod sleeve section 101. A piece of hook or loop fastening material 111 can be attached to the main outer layer 137 near the tip end 128*b*. A separate longer piece of hook or loop material 114 is attached to the main outer layer 137 at a predetermined distance away from the tip end 128*b* within the tip section 128*a*. Excess material 128*c* can be folded over 402 and secured utilizing attached plurality of hook or loop material 111, 114. The hook or loop material 111 is attached to the hook or loop material 114 wherein adjusting the length of the tip section 128*a*, adjusts the overall length of the case 300 to accommodate varying lengths of fishing rods. Other alternative for adjusting the length of the tip section 128 within the rod sleeve 101 can include laces for securing the excess material by tying it down or magnets arranged in a similar manner to the nylon or plastic snaps depicted in FIG. 6B. FIG. 6D, FIG. 6E, FIG. 6F illustrate adjusted tip section 128*a* in the closed position. The excess material 128*c* has been folded over and secured as described (FIG. 6A, FIG. 6B FIG. 6C). FIG. 6D illustrates securing the excess material 128*c* using straps. To adjusting the length of the tip section an attached retaining strap 116 is placed perpendicularly across the outside of the main outer layer 137 within the tip section 128*a* at a predetermined distance from the tip end 128*b*. Folding over the excess material 128*c* within the tip section 128*a* and tucking said excess material 128*c* underneath the retaining strap 116 therein adjusts the length of the tip section, and thereby creating a custom fit for a fishing rod stored within the case. FIG. 6E illustrates securing the excess material 128*c* using snaps. FIG. 6F illustrates securing the excess material 128*c* using hook and loop material. In FIG. 6E the male or female snap 111b is engaged to a receiving male or female snap 114b thus securing and eliminating the excess material 128c within the tip section 128a and providing a custom fit for the stored rod blank 210a and fishing rod guides 207.

FIG. 7

Figure 7:
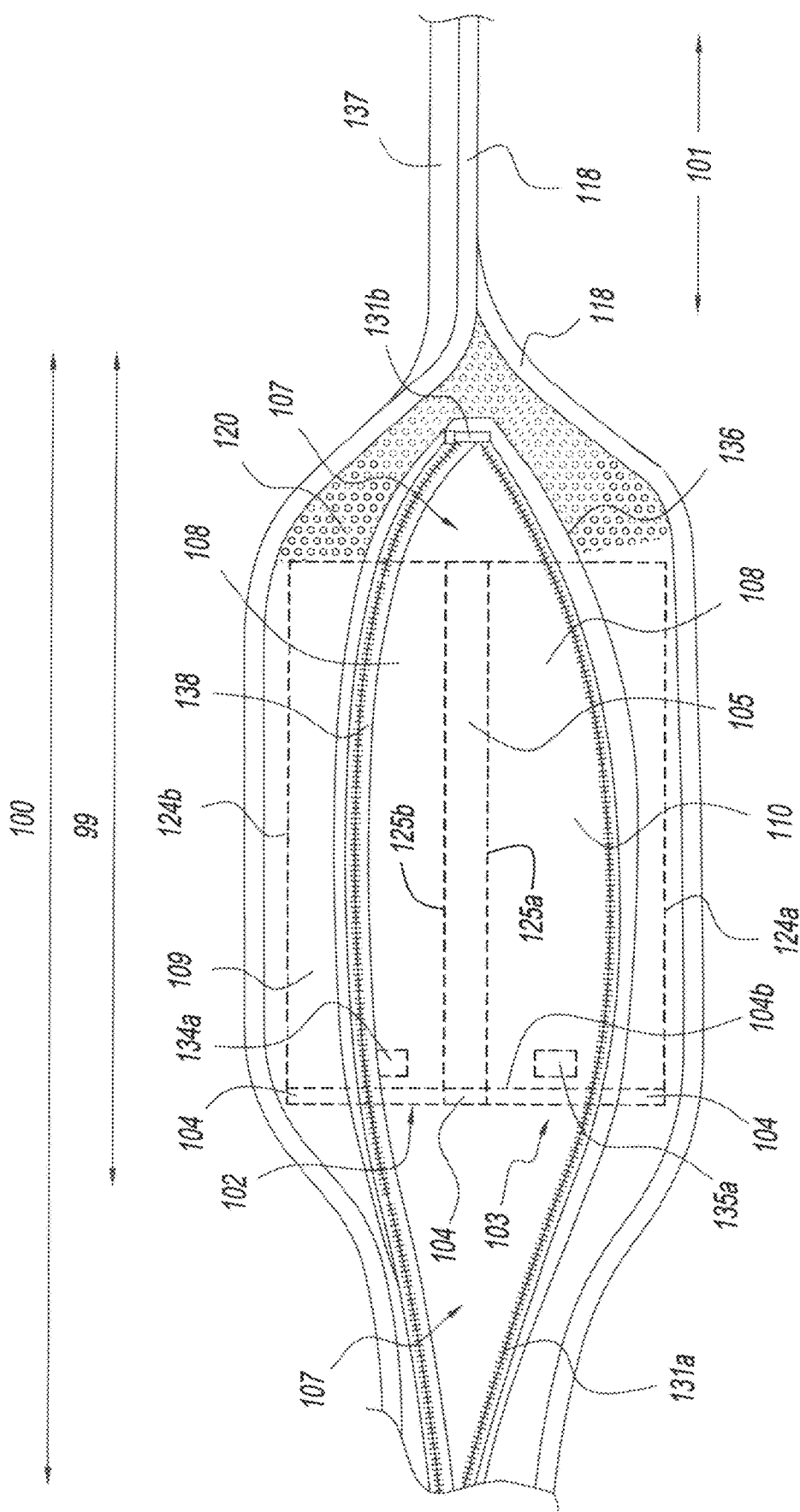
FIG. 7 is a plan view of the zipper opening and the internal cavity of the belly section of the integrated protective fishing case.

FIG. 7 is a plan view of the zipper opening and the internal cavity 107 of the belly section 99 of the integrated protective fishing case 300. The zipper Assembly 131b 131a, 132 is shown in the open position exposing the protective zipper flap 138, the left storage pocket 109 and its opening 102, the double layer median section 105, the right storage pocket 110 and its opening 103. The zipper assembly 131b is attached via stitching 136 to the second outer layer segment 120 and the main outer layer 137. The internal protective zipper flap 138 is attached via stitching or other means to the internal cavity 107. The left storage pockets 109, and the right storage pocket 110 are formed by attaching a segment of material 108 to the inside of the internal cavity 107 via stitching or other means 124a, 124b, 125a, 125b. The internal layer segment 108 can be comprised of laminated foam, laminated rubber, synthetic, woven or other suitable materials. In the preferred embodiment the edges of the openings 102, 103 of the internal protective storage pockets 109, 110 are covered with soft material used as binding 104, via stitching or other means 104b.

A plurality of hook and loop fastening material 134a,135a are attached to the inside of the internal protective storage pockets 109,110 near the openings 102,103. The hook and loop fastening material 134a, 135a is configured to secure pretied lures hooks and or weights 600 within various sizes of commercially available lure wraps. A plurality of stitching 125a, 125b forms a median section 105. The median section 105 comprised of a double layer of material provides additional layer of protection for the fishing rod reel seat 200a, 201, reel seat trigger 200b, fishing rod blank 210 a or rear main grip 218a, (shown in FIG. 2). The rod sleeve section 101 extends to the tip section 128a, 128b. A plurality of stitching or other means 115, binding 118 form the unions between the main outer layer 137 and the second outer layer segment 120 and the zipper assembly 131b. The binding 118 is attached along the edges of the case 300 protecting the seams that form a union between the main outer layer 137, the second outer layer segment 120 and the zipper assembly 131b. The binding 118 as serves as a protective and decorative finish for the seams and edges of the case 300. Shown in this figure, the preferred embodiment includes a breathable and or perforated second outer layer segment 120 that allows ventilation and evaporation of moisture within the case 300. The second outer layer segment 120 can be made from laminated foam, laminated synthetic rubbers, woven, knitted or other suitable materials and in an embodiment, can incorporate anti rust, anti corrosive, moisture wicking, and or antimicrobial properties. In the preferred embodiment the second outer layer segment 120 is made from perforated, laminated foam or rubber aiding in impact resistance further protecting the stored fishing tackle within the case 300 while allowing ventilation and evaporation of moisture from within the case.

FIG. 8

Figure 8:
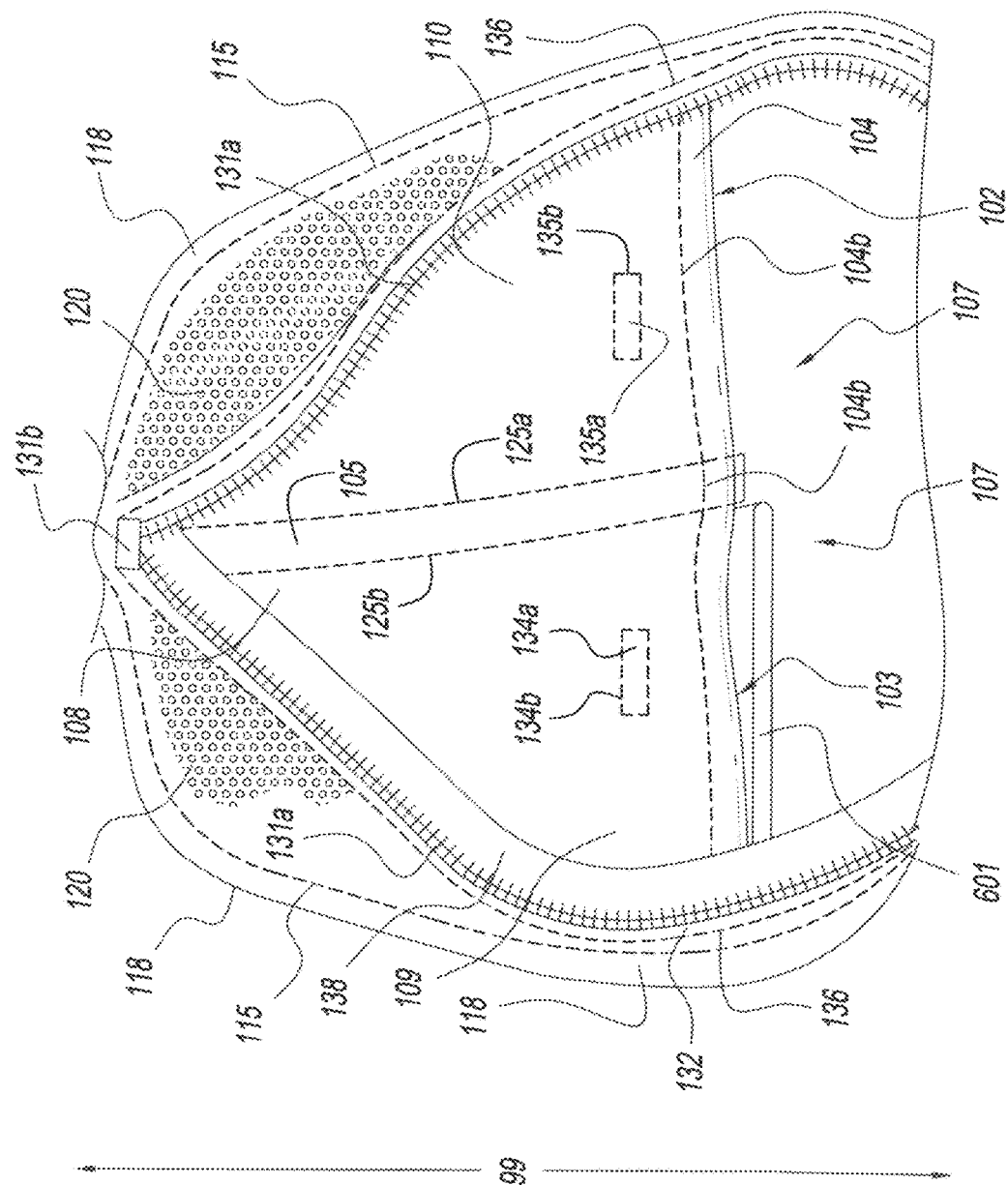
FIG. 8 is a partial view of the belly section showing details of the internal protective storage pockets housing a commercially available lure wrap.

FIG. 8 is a partial view of the belly section 99 showing details of the zipper assembly 131b, 131a in the open position exposing the protective zipper flab 138, the openings 102, 103 to the internal protective storage pockets 109,110 and the double layered median section 105. The primary function of the internal protective storage pockets 109,110 is to keep sharp hooks, weights and other damaging tackle away from the fishing rod blank 210a, 210b, 310a, 310b, the reel seat 200a, 201, 200b, 300, the main grip 218a, 318a, rear grip 218b, 318b, guides 207, 307, the rod tip 310c, 210c, fishing reel 215, 315, and fishing line 206 effectively eliminating damage caused by sharp hooks, weights and damaging tackle. Other personal or small items can be kept within the internal protective storage pockets 109,110. The protective zipper flap 138 comprised of laminated foam, laminated rubber or other suitable materials, is attached via a plurality of stitching 136. The stitching 136 forms a union between the zipper tape 132, the second outer layer segment 120 and protective zipper flap 138. The protective zipper flap 138 is attached between the zipper teeth and the internal cavity 107 forming a protective layer between the zipper teeth 131a and the stored fishing gear. This protective zipper flap 138 prevents damage to stored tackle that can be caused by zipper abrasions. Binding 104 covers the edge of the openings 102, 103 of the internal protective storage pockets 109,110 and median section 105. Binding 104 comprised of soft woven or knitted material is attached via stitching or other means 104b and protects fishing line 206, and or other items from abrasions that can occur while the lure wrap 601 is being inserted and stored. The median section 105 is formed by a plurality of stitching 125a, 125b comprising of a double layer of material that provides additional layer of protection for the fishing rod reel seat 200a, 201 reel seat trigger 200b, fishing rod blank 210a, 310a or rear main grip 218a, 318a (shown in FIGS. 2 and 3). A plurality of hook and loop fastening materials or other means 134a, 135a is attached inside and near the openings 102,103 of storage pockets 109,110 via stitching or other means 134b, 135b. The hook and loop fastening 134a, 135a can be used to secure items within the internal storage pockets 109,110.

FIG. 9A, FIG. 9B, FIG. 9C

Figure 9A:
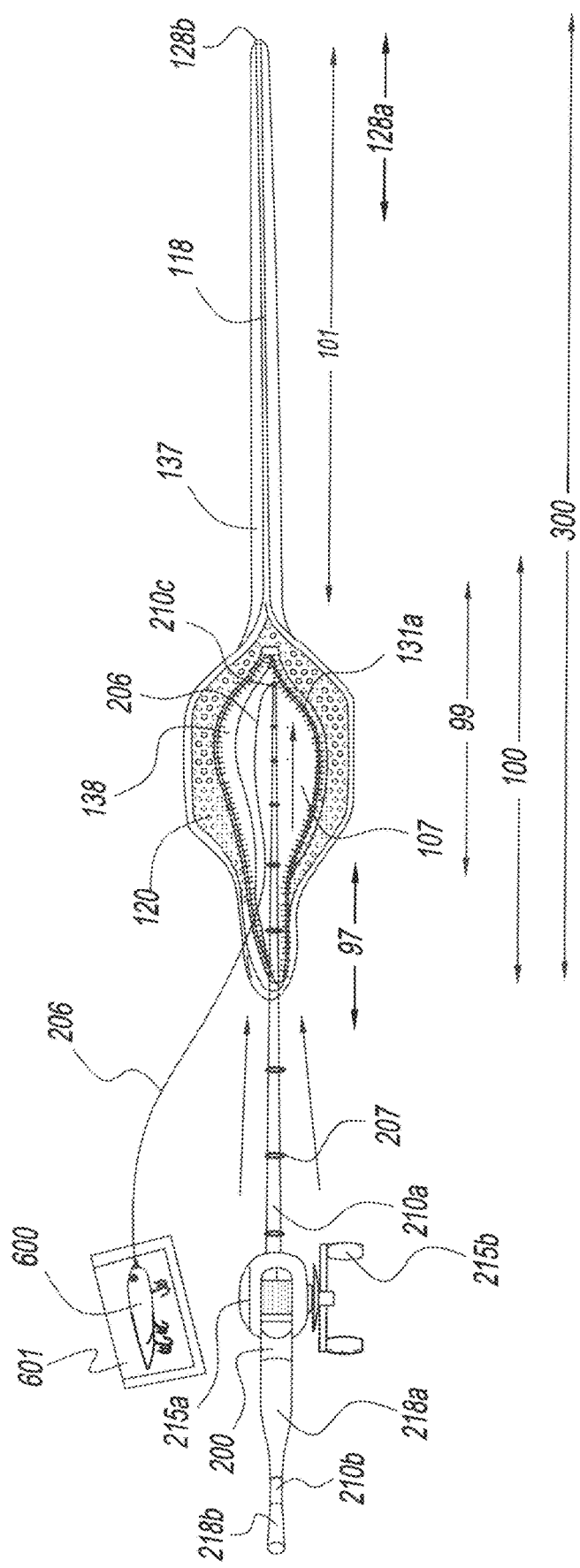
FIG. 9A, FIG. 9B, FIG. 9C are schematic illustrations of inserting and storing a fishing rod, fishing reel and pretied lure within the integrated protective fishing case.
Figure 9B:
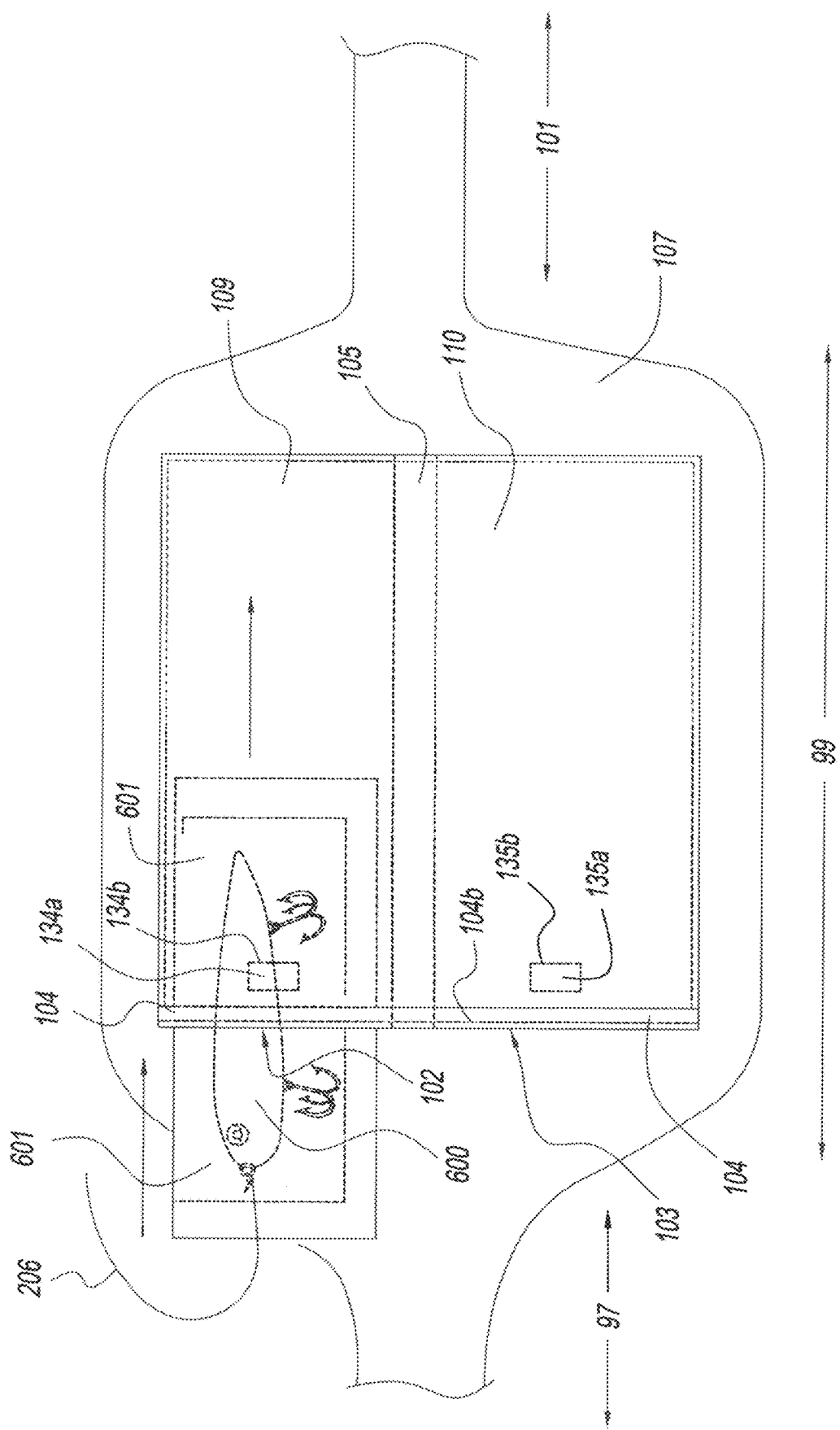
Figure 9C:
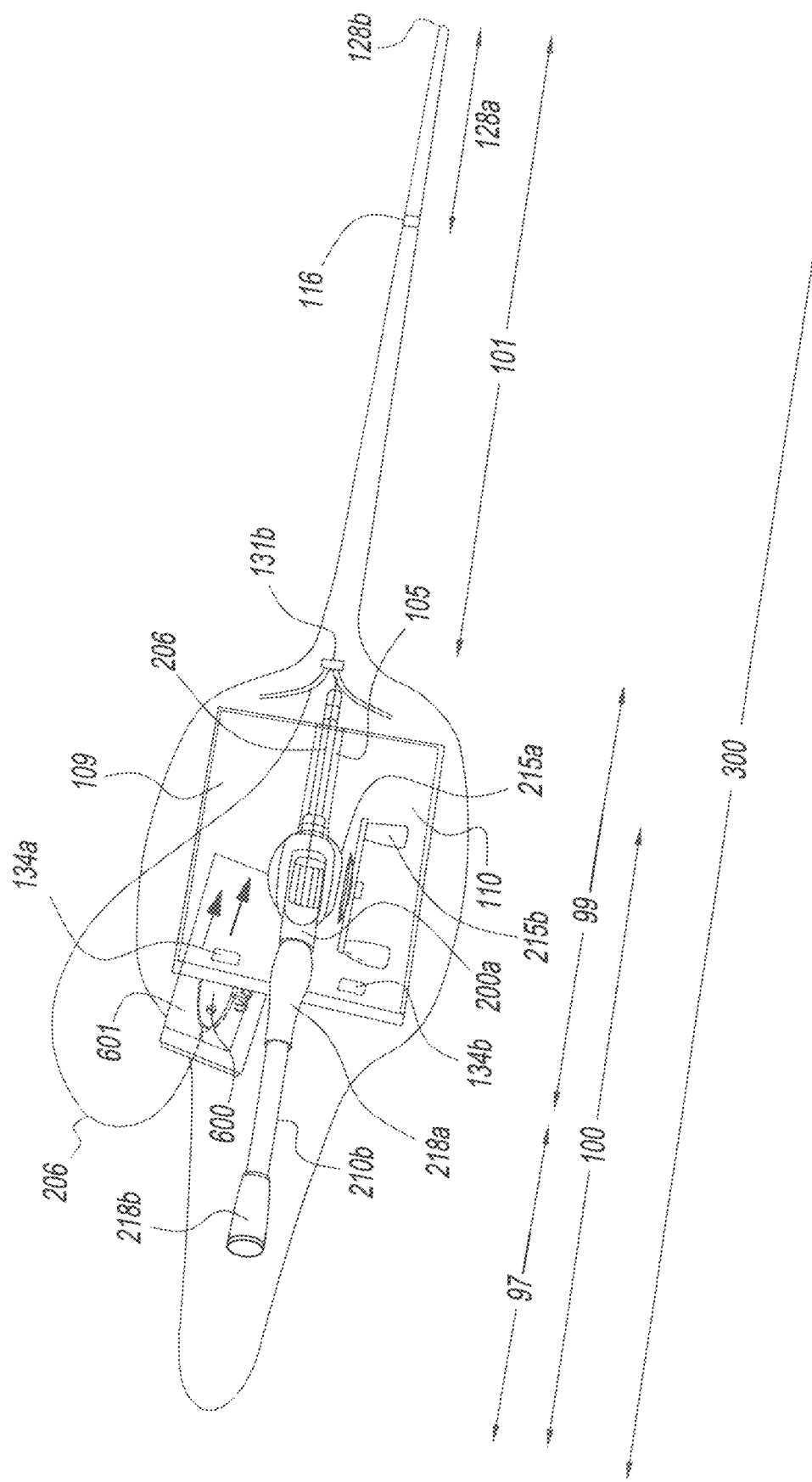

FIGS. 9A, 9B, and 9C illustrate the preferred method for inserting and securing a fishing rod 210a, 310a, 210b, 310b, 218a,318a, 200a, 200b, 300, 207, 307, 310c, 210c, fishing reel 215a, 215b, 315a, 315b fishing line 206, fishing lures hooks and or weight 600 within a commercially available lure wrap 601.

FIG. 9A depicts the preferred method and orientation for inserting a rod, reel, line, lure, hooks, weight within a wrap into the fishing case 300. As an example, a baitcasting rod and reel combination is shown in FIG. 9A. The fishing rod tip 210c and fishing line 206 are inserted into the opening of the handle section 100 first. The fishing line 206 and rod tip 210c continue into the rod sleeve section 101 until the complete combination of rod 200, 207, 210a, 210b, 210c, 218a, 218b, reel 215a, 215b line 206 and lure 600 within wrap 601 are within the case 300.

FIG. 9B depicts the preferred method and orientation for inserting a pretied lure, hooks, weights 600 within a lure wrap 601 into one of the internal storage pockets 109 or 110.

FIG. 9C is a cutaway view of the case 300 depicting the rod and reel fully inserted within the case 300. FIG. 9C also depicts the preferred method and orientation of inserting the lure within the wrap into the internal protective storage pocket 109 opposite the reel handle 215b. The case 300 includes two internal storage pockets 109,110 allowing a user to preferably secure the lure, hooks, weights 600 within the wrap 601 in the internal protective pocket 109 opposite the side of the reel handle 215*b* where more space is available. Securing the lure, hooks and or weight 600 within the lure wrap 601 in the protective storage pocket 109 on the opposite side of reel 215*a* and its handle 215*b* more efficiently utilizes any available space within the internal cavity 107.

Figure 9D:
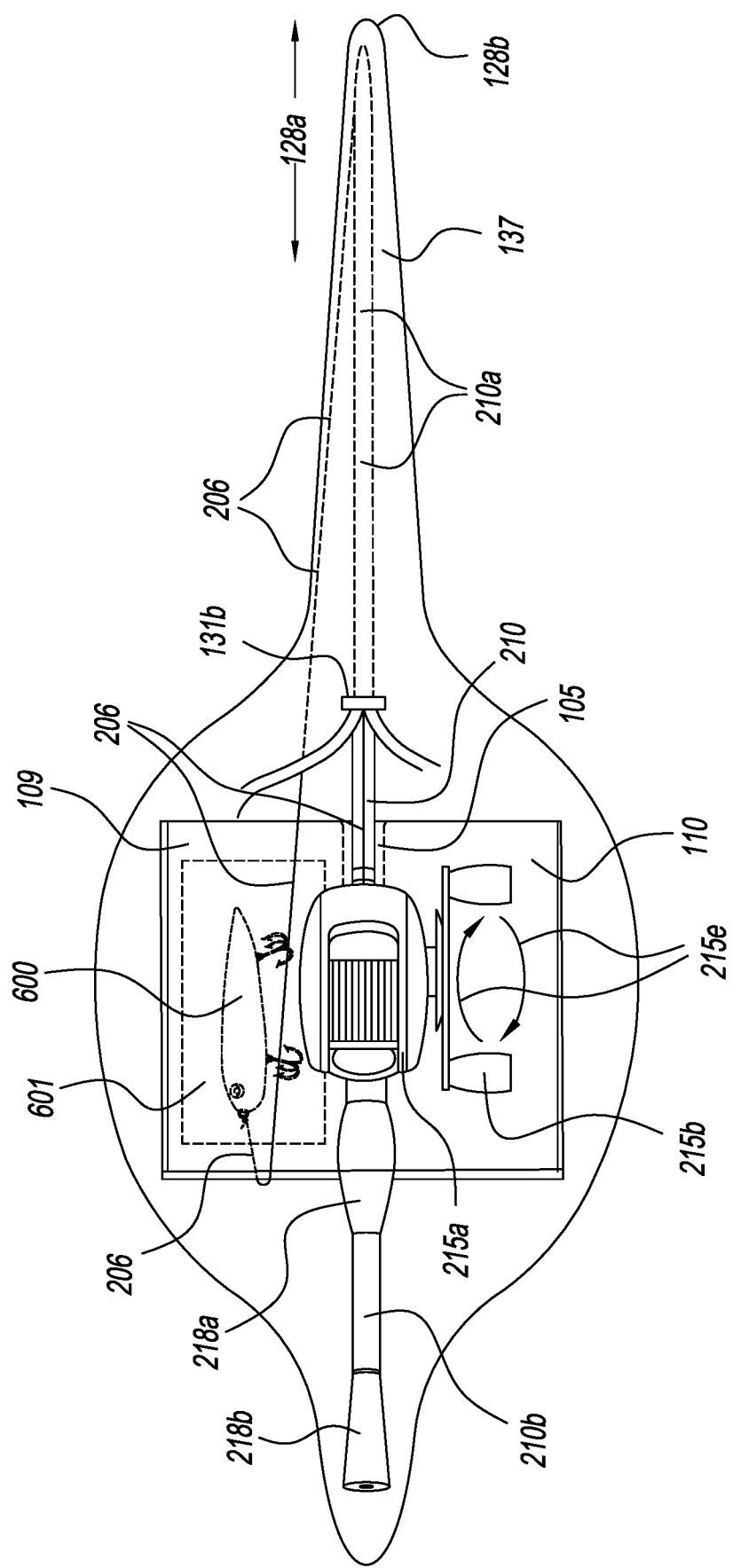
FIG. 9D depicts a pretied lure within the lure wrap further secured within the internal storage pocket as a result of tension on the fishing line that is created by turning the fishing reel handle.

After the pretied lure hooks and or weight 600 within a lure wrap 601 is fully inserted into one of the internal storage pockets 109 or 110, preferably on the opposite side of the fishing reel handle 215*b*, any slack fishing line 206 is taken up by turning the reel handle 215*b* and wherein creating tension that keeps the lure wrap 601 within the internal protective storage pocket 109 or 110 in place, unable to fall out of the internal protective storage pocket 109, or 110. The fishing case 300 is constructed to internally separate and secure pretied lure, hooks and weights 600 stored in a lure wrap 601 from the stored fishing rod and reel. FIG. 9D depicts a stored fishing rod (210, 210*a*, 210*b*, 218*a*, 218*b*), fishing reel (215*a*, 215*b*), pretied lure 600 within a wrap 601 housed within the left internal storage pocket 109. The pretied lure 600 within the wrap 601 is further secured within the internal storage pocket 109 due to tension on the fishing line 206 that is created by turning 215E the reel handle 215*b* to remove any excess slack from the fishing line 206 in the tip section 128*a* within the rod sleeve section 101. The tension that is created by turning 215E the reel handle 215*b* further secures the pretied lure 600 within the wrap 601 and is unable to fall out of the pocket 109. The wrap 601 having pretied lure, hooks and weights is secured in place when stored, during motion or while in transit.

FIG. 10

Figure 10:
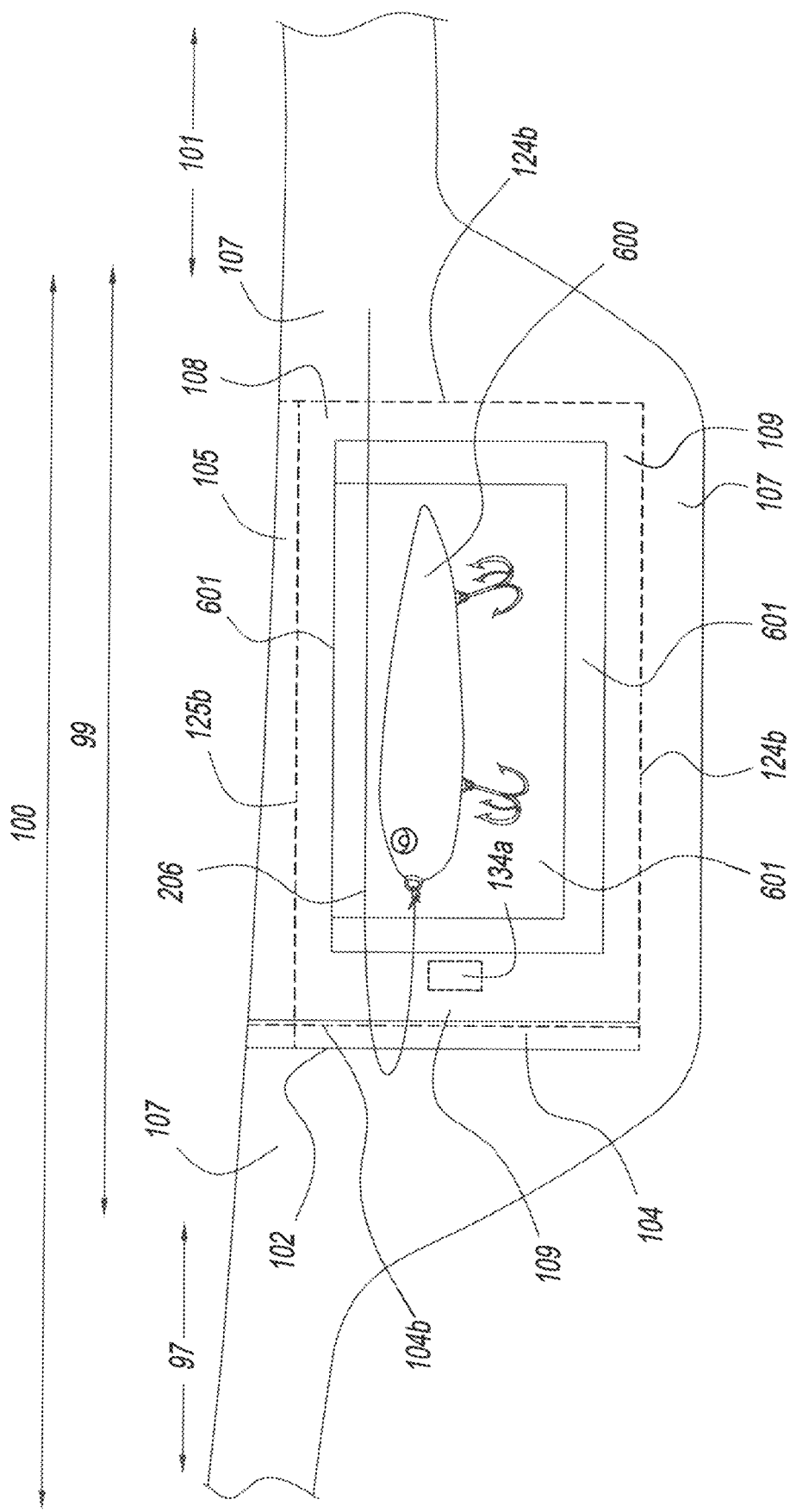
FIG. 10 is a partial view of one of the internal protective storage pockets within the integrated protective fishing case housing a pretied lure within a commercially available lure wrap.

FIG. 10 is a partial view of the handle section 100 from a side perspective. This figure shows an internal view of the belly section 99 depicting the preferred orientation for storing and securing pretied lure hooks and or weight 600 enveloped in a wrap 601 and inserted into one of the internal protective storage pockets 109. In FIG. 10 the fishing line 206 exits the lure wrap 601, the internal protective storage pocket 109 and is protected by the soft binding 104 that covers the edge of the opening 102 to the internal protective storage pocket 109. The rod sleeve section 101 and the butt section 97 of the fishing case 300 are illustrated to show orientation of the handle and the belly section. The fishing line 206 exits the internal storage pocket 109 and is protected by a plurality of soft binding 104, attached to the edge of the opening of the internal storage pocket 109, via stitching or other means 104*b*.

FIG. 11

Figure 11:
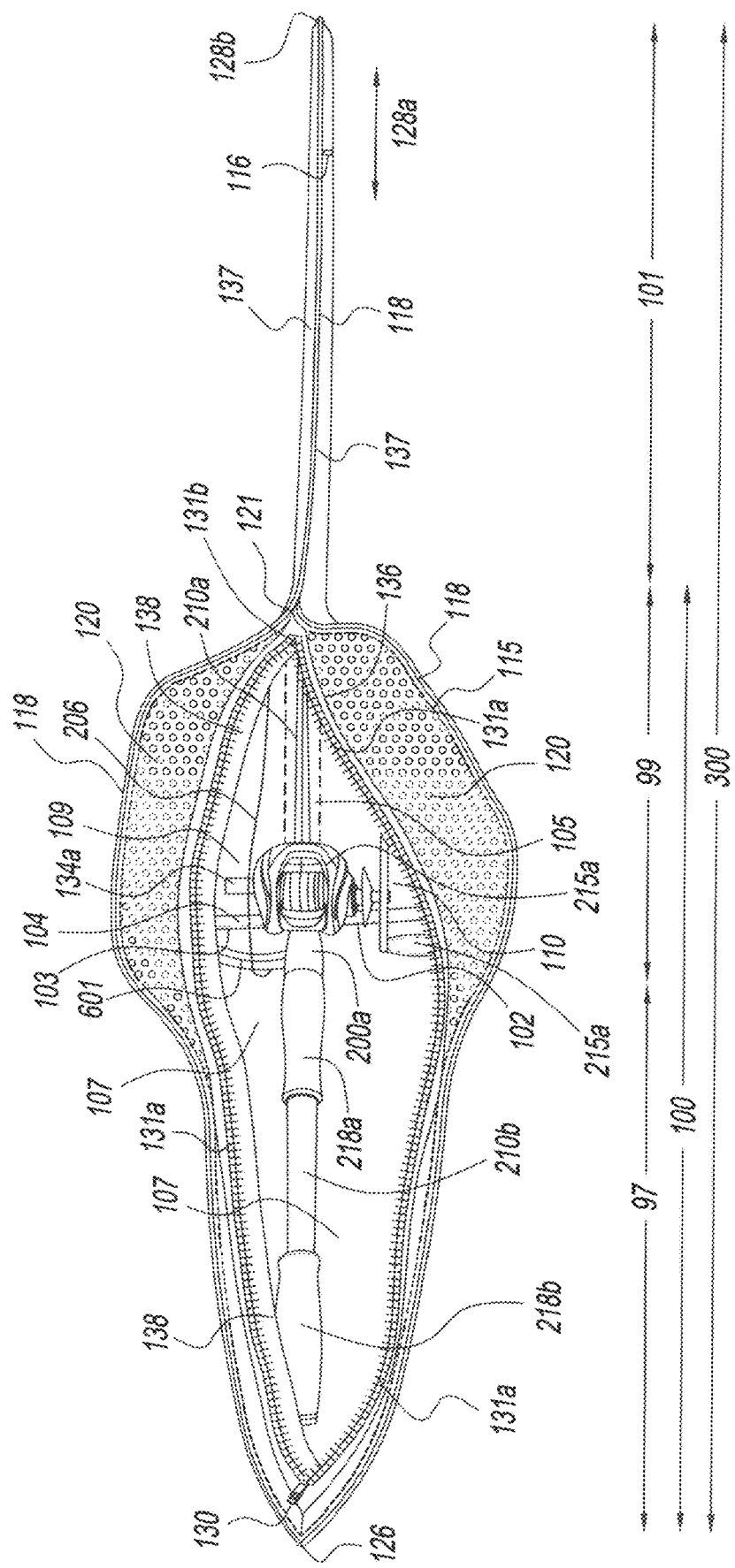
FIG. 11 is a detailed schematic top view of the integrated protective fishing case housing a convention or baitcasting rod, reel and pretied lure enveloped within a commercially available lure wrap.

FIG. 11 shows a top view of the integrated protective fishing case 300 having a handle section 100 comprised of a belly section 99 and the butt section 97. The protective case 300 is also comprised of a rod sleeve section 101 having a tip section 128*a*, 128*b*. The case 300 is comprised of main outer layer 137, a second layer segment 120 and an internal layer segment 108 that forms the internal protective storage pockets 109, 110. The tip section 128*a* and tip end 128*b* include a means 116 for adjusting the length of the rod sleeve section 101 thereby adjusting the overall length of the case 300. In the preferred embodiment the second outer layer 120 is made from breathable materials such as perforated laminated foam, perforated laminated rubber or other suitable materials allowing moisture inside the case to evaporate. The second outer layer 120 is attached to the main outer layer 137, protective zipper flap 138 and zipper assembly 131*b*, thereby forming a plurality of unions 113*a*, 113*b*, 113*c*, 121 between the main outer layer 137, the second outer layer 120 and zipper assembly 131*b* having zipper components 130, 131*a*, 132. The internal layer segment 120 forms the protective internal storage pockets 109,110 and a median section 105. The protective case 300 includes a zipper assembly 131*b* (130, 131*a*, 132) and an internal protective zipper flap 138 that protects the stored fishing rod real from abrasion that can be caused by the zipper. The internal protective storage pockets 109, 110, and double layer median section 105 are depicted. The hook and loop fastening materials or other means 134*a* for securing items within the internal storage pockets 109,110 is depicted. The binding 118 attached via stitching or other means 115 is depicted covering seams and unions of the case 300. Th union 121 between the main outer layer 137 and the second outer layer segment 120 is depicted. The zipper assembly 131*b*, 130,131*a*, 132 is attached to the second outer layer segment 120 and internal protective zipper flap 138 and main outer layer 137 via stitching or other means 136. The fishing rod 200*a*, 210, 210*a*, 210*b*, 218*a*, 218*b*, baitcasting reel 215*a*, 215*b* fishing line 206, are depicted fully inserted in the internal cavity 107 of the case 300 while the commercially available lure wrap 601 resides in one of the internal protective storage pockets 109 opposite the reel handle 215*b*. The binding 104 protects the fishing line 206 from damage and or abrasion. A commercially available lure wrap 301 is depicted fully inserted within the case 300 and within the internal protective storage pocket 109. The butt end 126 is formed by the union of main outer layer 137, the zipper tape 132 and the binding 118. The zipper pull 130 is depicted and is used to open and close the zipper assembly 131*b*. The zipper teeth 131*a* are depicted and are a component of zipper assembly 131*b*. The opening of the internal protective storage pockets 102, 103 are depicted within the internal cavity 107 of belly section 99 of the case 300. The rear grip section 97 protects a portion of the main grip 218*a*, fishing rod 210*b* and rear grip 218*b*.

What is claimed:

1. A fishing case for protecting a stored fishing rod and lures comprising:
   a main outer layer attached to a second outer layer segment forming an outer layer covering and an internal cavity, the internal cavity including a rod sleeve section and a handle section, the rod sleeve section including a tip section, the handle section having an outwardly protruding flared belly section and a butt section;
   a butt layer attached to the main outer layer at the beginning of the butt section and extending to a butt end; and
   a right-side internal storage pocket and a left-side internal storage pocket positioned on opposite sides within the flared belly section and separated by a double layer median section;
   the right-side internal storage pocket and the left-side internal storage pocket being substantially similar in size.

2. The fishing case of claim 1, wherein the second outer layer material is perforated breathable laminated foam or perforated breathable rubber.

3. The fishing case of claim 2, wherein the double layer median section attaches to an internal layer segment to form a protective layer.

4. The fishing case of claim 1, wherein the right-side internal storage pocket is stitched to the main outer layer;

and the right-side internal storage pocket includes a right opening; wherein the right-side internal storage pocket includes a soft binding along the opening edge of the right-side internal storage pocket and, said right-side internal storage pocket further including a plurality of hook and loop fastening materials or snaps.

5. The fishing case of claim 1, wherein the left-side internal storage pocket is stitched to the main outer layer; and the left-side internal storage pocket includes a left opening; and wherein the left-side internal storage pocket includes a soft binding along the opening edge of the left-side pocket; and, said left-side internal storage pocket further including a plurality of hook and loop fastening materials or snaps.

6. The fishing case of claim 5 wherein said right-side internal storage pocket and the left-side internal storage pocket are configured to receive, cover, and protect one or more pretied lures, hooks and weights within the a lure wrap stored within the case.

7. The fishing case of claim 6, wherein the soft binding is attached via stitching to a plurality of seams and unions along the edges of the protective case; and wherein the soft binding material comprises knitted, woven, or synthetic material.

8. The fishing case of claim 7, further comprising a layer for separating the fishing gear stored within the case from a plurality of zipper teeth;

wherein a zipper assembly is attached to the second outer layer segment and a zipper flap and the main outer layer via stitching, and wherein the zipper flap is attached between the zipper teeth and the internal cavity to form a protective layer between the zipper teeth and the stored fishing gear.

9. The fishing case of claim 1, further comprising a retaining strap attached along an outside of the main outer layer within the tip section at a predetermined distance from an end of the tip section.

10. The fishing case of claim 1, further comprising a plurality of female or male snaps attached to the main outer layer within the tip section at varying predetermined distances from an end of the tip section; and a male or a female snap attached at approximately the end of the tip section;

wherein the end of the tip section has a male or a female snap folded and attached to a receiving male or female snap.

11. The fishing case of claim 1, further comprising a plurality of hook or loop material attached to the main outer layer near the tip end, wherein a receiving hook or a loop material is attached along outside the main outer layer at a predetermined distance from the end of the tip section; wherein the excess tip section material is folded and secured to the receiving hook or loop material; adjusting the length of the tip section.

12. The fishing case of claim 1 wherein at least one of the left-side internal pocket and the right-side internal pocket is configured to store a lure wrap that contains pretied lures, hooks and weights.

13. The fishing case of claim 1 wherein the internal layer segment comprises laminated foam, laminated or synthetic rubber.

14. An apparatus comprising:

a main outer layer attached to a second outer layer segment to form an outer layer covering and an internal cavity, said second outer layer segment comprising perforated breathable material, the internal cavity including a rod sleeve section and a handle section, the rod sleeve section including a tip section, the handle section having an outwardly protruding flared belly section and a butt section;

a butt layer attached to the main outer layer at the beginning of the butt section and extending to a butt end; and a right-side internal storage pocket and a left-side internal storage pocket positioned on opposite sides within the belly section and separated by a double layer median section; the right-side internal storage pocket and the left-side internal storage pocket being substantially similar in size.

15. The apparatus of claim 14, further comprising a retaining strap attached along an outside of the main outer layer within the tip section at a predetermined distance from an end of the tip section; and wherein excess material within the tip section is folded underneath the retaining strap.

16. The apparatus of claim 14, further comprising a zipper assembly attached to the second outer layer segment and a zipper flap and the main outer layer.

17. The apparatus of claim 14 further comprising a plurality of female or male snaps attached to the main outer layer within the tip section at varying predetermined distances from an end of the tip section; and a male or female snap attached at approximately the end of the tip section; wherein the end of the tip section has a male or female snap folded and attached to a receiving male or female snap.

18. A method comprising the steps of:

attaching a main outer layer and a second outer layer segment to form an outer layer covering and an internal cavity, the internal cavity including a rod sleeve section and a handle section, the rod sleeve section including a tip section, the handle section having an outwardly protruding flared belly section and a butt section;

attaching a right-side internal storage pocket and a left-side internal storage pocket on opposite sides within the belly section and separated by a double layer median section, said pockets being substantially similar in size and having a plurality of soft binding along opening edges, said pockets further including a plurality of hook and loop fastening materials or snaps; and attaching a zipper assembly to the second outer layer segment and a zipper flap and the main outer layer.

* * * * *